United States Patent

[11] 3,612,950

| [72] | Inventor | Thomas A. Knott<br>136 Lambton Road, Wimbledon, London S W 20, England |
|---|---|---|
| [21] | Appl. No. | 858,823 |
| [22] | Filed | Sept. 17, 1969 |
| [45] | Patented | Oct. 12, 1971 |
| [32] | Priority | Sept. 18, 1968 |
| [33] | | Great Britain |
| [31] | | 44301/68 |

[54] MOTOR CONTROL SYSTEM
11 Claims, 1 Drawing Fig.

[52] U.S. Cl. .................................................. 317/13 B, 317/20, 318/158
[51] Int. Cl. ....................................................... H01j 9/38
[50] Field of Search........................................... 318/144, 148, 158; 317/13 B, 13 R, 20, 27, 51

[56] References Cited
UNITED STATES PATENTS

| 3,155,877 | 11/1964 | Jensen........................... | 317/13 |
| 3,351,812 | 11/1967 | Cutler et al..................... | 317/13 |
| 3,502,944 | 3/1970 | Squiers........................... | 37 T/41 |
| 2,748,340 | 5/1956 | Brunner et al. ................. | 318/148 |
| 3,089,991 | 5/1963 | Stamm ........................... | 318/158 |
| 3,108,214 | 10/1963 | Wilkerson ...................... | 318/158 |
| 3,192,459 | 6/1965 | Richards et al................ | 318/144 |

*Primary Examiner*—Oris L. Rader
*Assistant Examiner*—K. L. Crosson
*Attorney*—Townshend and Meserole

ABSTRACT: Disclosed is a motor control system for energizing a motor which in turn drives a pump for pumping liquefied gases. A 3-Φ alternator (alt.) supplies current to the motor. The alternator field winding is supplied with a first current by a low voltage circuit and with a second current by a current sensing circuit connected to sense the load current passing from the alternator to the motor and to generate a current which is a function of the load current. A single cutout relay having a first pair of contacts connected in the low-voltage circuit and a second pair of contacts connected in the current sensing circuit operates to disconnect both the low-voltage circuit and the current sensing circuit from the alternator field winding, and, thereby stop the motor and pump, whenever any one of several monitored parameters exceeds a chosen threshold value.

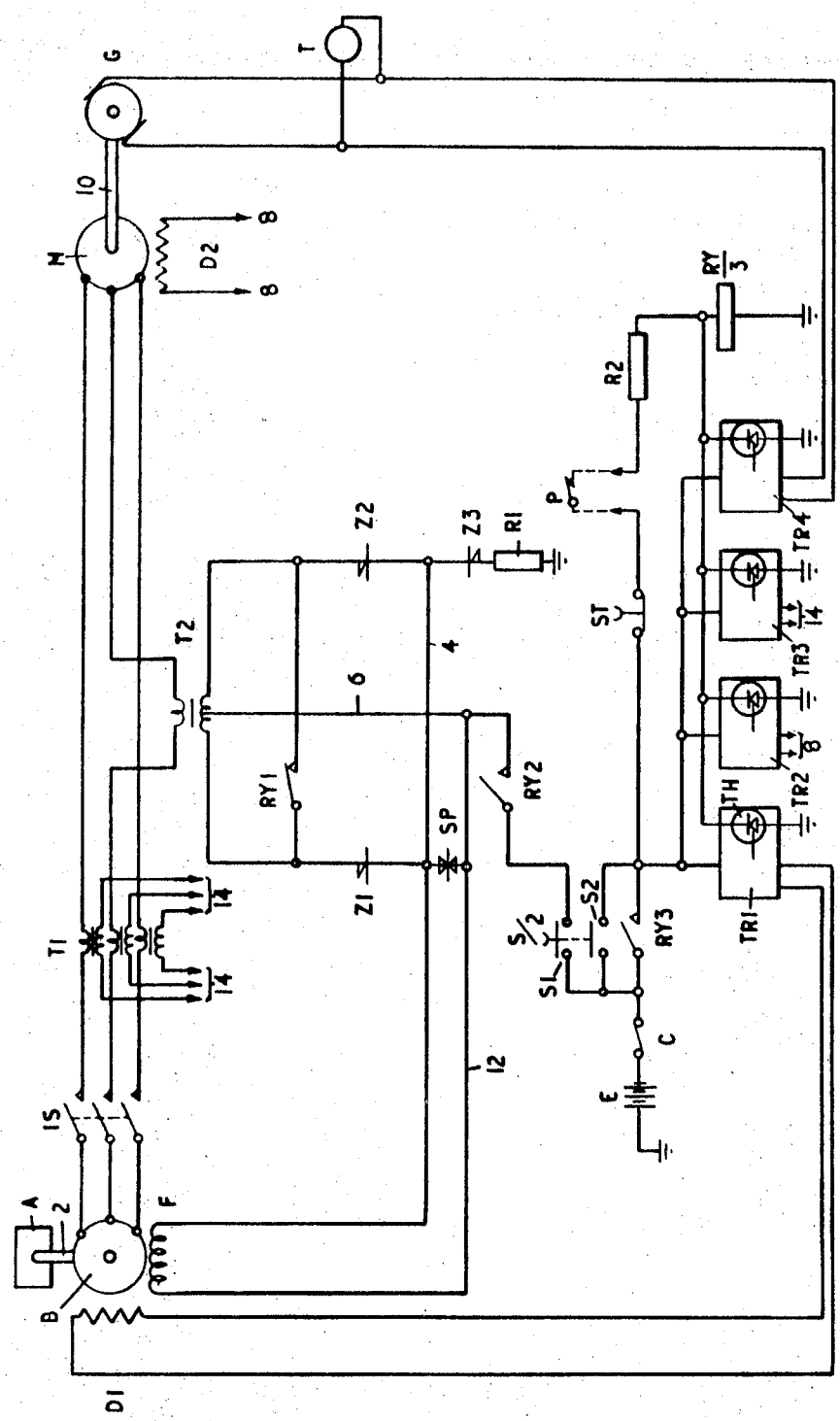

MOTOR CONTROL SYSTEM

This invention relates to a motor control system, particularly for controlling a motor which drives a pump for pumping liquefied gases, but the invention is not limited to this application.

Liquefied gases are transported by tankers from which they are pumped to storage by tanker-mounted pumps powered indirectly by the road engine of the tanker. With liquid oxygen in particular it is essential that the electrical circuitry of the pump control system does not give rise to sparks under operating conditions, which spark-generation primarily occurs as switches are opened and closed while energized. This is because pockets of oxygen or oxygen-enriched air (caused by accidental spillage or leakage) might cause insulation or other combustible material in the vicinity to ignite, with the consequent risk of explosion of the remaining quantity of liquefied oxygen carried by the tanker.

The present invention aims at providing a motor control circuit which is intrinsically safe under all foreseeable operating malfunctions, and accordingly provides a motor control system to prevent dangerous conditions arising in the pumping of liquefied gases, particularly the pumping of liquid oxygen.

The present invention will now be described by way of example with reference to the accompanying drawing, which is a schema of a motor control circuit.

In the circuit shown in the drawing, the road engine A of a tanker is directly coupled by a shaft 2 to an alternator B. The alternator produces a three-phase current of which all three phases pass through an isolating switch IS, then through three balanced fault-detection transformers T1 before two of the phases go directly to a motor M coupled to drive an associated pump (not shown) for liquefied gases. Before passing to the motor M, the third phase passes through a current transformer T2 of which the purpose is described below.

Associated with the alternator B is a field winding F which has a surge protector SP connected across it. As shown in the drawing, the secondary winding of the current transformer T2 has connected across it a normally closed contact RY1 of a relay RY, and a conductor 4 which is prevented from short circuiting the transformer T2 by virtue of two rectifiers Z1 and Z2. Rectifier Z2 is connected through an oppositely poled rectifier Z3 to earth through a resistor R1.

Connected to the center of the secondary winding of transformer T2 is a conductor 6 which passes through a normally open contact RY2, and a normally open contact S1 of a start switch S, before passing through a fuse C to an accumulator E which has its positive terminal connected to earth.

The switch S also has a normally open contact S2 which is shunted by a contact RY3 of relay RY acting as a self-holding contact. This parallel arrangement of contacts is connected in turn to four parallel-connected trip switches TR1 to TR4, and to a series-connected circuit comprising a stop switch ST, a remotely located pressure switch P, a resistor R2, and the operating coil of relay RY, the other side of which is connected to earth.

Each of the trip switches TR includes a thyristor TH (or other form of controlled rectifier).

One side of each of the thyristors TH is connected to earth, and the other side to the negative side of relay RY, intermediate the relay and resistor R2.

The control element of each thyristor TH in each of the trip switches TR is connected to an associated fault detecting voltage source so that when the voltage of the source rises above a chosen level a signal is applied to the control element of the associated thyristor TH to make it fully conductive, so that any voltage then present across the relay RY is short-circuited and the relay becomes deenergized.

Trip switch TR1 is connected to a thermistor D1 which is in intimate thermal contact with the windings of the alternator B, so that should the temperature of the windings rise above an acceptable level then the circuit is switched off.

Similarly, trip switch TR2 is connected via leads 8 to a thermistor D2 in the windings of the motor M.

The trip switch TR3 is connected via leads 14 to the fault-detection transformers T1. These have several functions; they operate the trip switch TR3 when there is an excessive rate-of-rise of current; when the current exceeds a specified level; when the interphase currents or voltages are excessively imbalanced, and when there is an earth fault current.

Motor M is connected by a shaft 10 to a tachogenerator G which is connected both to a tachometer T and to trip switch TR4. By this means, when the speed of the motor M, and therefore the pump driven by it, rise above an acceptable value the trip switch TR4 is operated.

The drawing illustrates the circuit when it is not energized. Thus even though the motor A may be driving the alternator B, the absence of any current in winding F prevents there from being any output from the alternator, so that the pump is not driven by the motor M.

When it is desired to drive the pump the isolator switch IS is closed and the switch S is closed by depression of the pushbutton. Assuming that the pump is primed, so that the pressure at the pump outlet is above its specified minimum pressure, with the consequence that switch P remains closed, then the relay RY is energized by battery E, the circuit being fuse C, contact S2, stop switch ST, pressure switch P, resistor R2, and relay RY, the circuit being completed through earth. Energization of relay RY causes contact RY1 to open, contact RY2 to close, and contact RY3 to close. Contact RY3 functions as a self-holding contact, in that the series circuit energizing relay RY remains made even when contact S2 is opened by release of the start switch. Closure of the normally open contact RY2 causes starting current to flow from the battery, the circuit being fuse C, contact S, contact RY2, field winding F, conductor 4, rectifier Z3, and resistor R1, the circuit again being completed through earth.

The effect of this injection of starting current is to cause the alternator to have an output which appears across the three phase leads. The current passes to the motor M through the transformer T1, with current in one of the phase leads passing also through the primary winding of current transformer T2. The effect of this current is to produce across the secondary winding of transformer T2 an alternating voltage which is full-wave rectified by the rectifiers Z1 and Z2 acting in combination, the current from these rectifiers flowing through conductor 4, field winding F, conductor 12, and the conductor 6 which leads to the center-tapping of the secondary winding of transformer T2.

When the motor M is starting up it draws a high-load current, which leads to the transformer T2 producing a correspondingly higher field current, leading in turn to an increased output from alternator B to produce a feedback effect. As the motor M speeds up it demands less current and this reduction in demand is reflected in a decrease in the current through field winding F, so that the output of the alternator is reduced correspondingly, the system eventually reaching a balanced condition in which the alternator drives the motor at its normal duty rating.

The tachometer T gives an indication of the speed of rotation of the pump, and it can be calibrated to indicate the rate of work of the pump or the speed of rotation of the shaft of the motor M.

As mentioned above in connection with the trip switches TR, energization of any of the trip switches by a rise in voltage of its corresponding control element above a value which is regarded as safe causes the relay RY to become deenergized. When this happens, closure of contact of RY1 short circuits the secondary winding of transformer CT2 so that the feedback loop is broken. Opening of contact RY2 prevents any starting current reaching field winding F from any of the circuitry associated with the accumulator and trip switches. This causes the alternator to have zero output, so that the motor and pump are stopped.

Opening of contact RY3 prevents the relay RY becoming accidentally reenergized, in that it breaks the energization circuit independently of any consequent reclosing of the trip switch which initiated the deenergization process.

As indicated above, the system can be similarly deenergized by the pressure switch P opening and by stop switch ST being depressed, but detailed description of the manner in which these two components actuate is omitted as being superfluous in view of the above description.

By virtue of the fact that the starting switch is associated with the accumulator circuitry, and is not in the three-phase high-voltage circuitry associated with the alternator and motor, there is negligible risk of operation of switch S producing s spark, and the 'guarding' (or flameproofing) of the starter switch is also simplified because of the lower voltage involved. It will also be appreciated that all the contacts of relay RY are in the low-voltage part of the circuit, with the above consequent advantages.

I claim:

1. In a motor control system for energizing a motor wherein said motor drives a pump for pumping liquefied gases, the combination of an alternator for supplying a load current to said motor, said alternator having a field winding and supply lines connecting said alternator to said motor; a cutout relay having a single operating coil and first and second pairs of contacts; a low-voltage circuit including a battery and said first pair of contacts, said low-voltage circuit being connected to supply current to said field winding; a current sensing circuit including said second pair of contacts, said current sensing circuit being adapted to sense said load current supplied from said alternator to said motor and to supply said field winding with a current which is a function of said load current; an energizing circuit including said battery for energizing said operating coil; and means for sensing an overheated condition of said motor and causing said operating coil to be deenergized, whereby said first pair of contacts are actuated to interrupt said low-voltage circuit and said second pair of contacts are actuated to interrupt said current sensing circuit to stop current flow in said field winding of said alternator and thereby stop said load current to said motor.

2. The motor control system set forth in claim 1 wherein said means for sensing an overheated condition comprises current transformer means operatively connected to said supply lines, said current transformer means causing said operating coil to be deenergized when said load current exceeds a predetermined level.

3. The motor control system set forth in claim 1 wherein said means for sensing an overheated condition comprises a tachogenerator operatively connected to said motor, said tachogenerator causing said operating coil to be deenergized when said motor speed exceeds a predetermined limit.

4. The motor control system set forth in claim 1 wherein said means for sensing an overheated condition comprises a pressure switch connected in said energizing circuit and adapted to be actuated and thereby deenergize said operating coil when the pumping pressure in said pump falls below a predetermined level.

5. The motor control system set forth in claim 1 further comprising a manual cutoff switch connected in said energizing circuit whereby said operating coil may be deenergized by actuation of said manual cutoff switch.

6. The motor control system set forth in claim 1 wherein said means for sensing an overheated condition comprises motor heat sensing means adjacent said motor, said heat sensing means causing said operating coil to be deenergized when said motor temperature exceeds a predetermined level.

7. The motor control system set forth in claim 1 further comprising alternator heat sensing means adjacent said alternator, said alternator heat sensing means causing said operating coil to be deenergized when said alternator temperature exceeds a predetermined level.

8. The motor control system set forth in claim 1 wherein said alternator is adapted to generate 3-$\Phi$ current, said supply lines connecting said alternator to said motor are adapted to conduct 3-$\Phi$ current and said current sensing circuit is adapted to sense said load current in only one of said 3-$\Phi$ supply lines.

9. The motor control system set forth in claim 8 wherein said means for sensing an overheated condition of said motor comprises current sensing means connected in each of said 3-$\Phi$ supply lines, said current sensing means causing said operating coil to be deenergized when said load current in any of said 3-$\Phi$ supply lines exceeds a predetermined level.

10. The motor control system as set forth in claim 1 wherein said current sensing circuit includes a current transformer having a primary winding connected to sense said load current and to generate a voltage across a secondary winding, a rectifier connected to said secondary winding and said second pair of contacts being connected across said secondary winding; said energizing circuit further including a third pair of contacts energized by said operating coil; and wherein said means for causing said operating coil to be deenergized comprises a trip switch operatively connected to said energizing circuit whereby when an overheated condition of said motor is sensed, said trip switch is actuated to deenergize said operating coil.

11. The motor control system as set forth in claim 10 wherein said trip switches include controlled rectifier devices having gate elements which are adapted to be actuated by said means for sensing an overheated condition.